(12) United States Patent
Cooley

(10) Patent No.: US 10,494,087 B2
(45) Date of Patent: Dec. 3, 2019

(54) DIFFERENTIAL TORQUE PLATE BARREL THICKNESS

(71) Applicant: GOODRICH CORPORATION, Charlotte, NC (US)

(72) Inventor: Phillip E. Cooley, Kettering, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 121 days.

(21) Appl. No.: 15/672,922

(22) Filed: Aug. 9, 2017

(65) Prior Publication Data

US 2019/0047686 A1   Feb. 14, 2019

(51) Int. Cl.
| | |
|---|---|
| *F16D 55/36* | (2006.01) |
| *B64C 25/44* | (2006.01) |
| *F16D 65/00* | (2006.01) |
| *B64C 25/34* | (2006.01) |

(52) U.S. Cl.
CPC .............. *B64C 25/44* (2013.01); *B64C 25/34* (2013.01); *F16D 55/36* (2013.01); *F16D 65/0006* (2013.01)

(58) Field of Classification Search
CPC .......... F16D 55/36; F16D 55/38; F16D 55/39; F16D 55/40; F16D 55/41; F16D 55/42; F16D 55/44
See application file for complete search history.

(56) References Cited

U.S. PATENT DOCUMENTS

| | | | | |
|---|---|---|---|---|
| 3,653,472 A | * | 4/1972 | Dowell | F16D 55/40 188/217 |
| 3,977,631 A | * | 8/1976 | Jenny | B64C 25/405 244/50 |
| 4,585,096 A | * | 4/1986 | Bok | F16D 13/648 188/71.5 |
| 5,323,881 A | * | 6/1994 | Machan | F16D 55/36 188/18 A |
| 5,485,898 A | * | 1/1996 | Patko | F16D 55/36 188/18 A |
| 5,819,882 A | * | 10/1998 | Reynolds | F16D 55/40 188/71.5 |
| 6,230,852 B1 | * | 5/2001 | Trustee | F16D 55/36 188/18 A |
| 6,241,062 B1 | * | 6/2001 | Enright | F16F 7/00 188/18 A |
| 6,340,075 B1 | * | 1/2002 | Bok | F16D 55/36 188/71.5 |

(Continued)

FOREIGN PATENT DOCUMENTS

| | | |
|---|---|---|
| EP | 0990812 | 4/2000 |
| EP | 1484226 | 12/2004 |

OTHER PUBLICATIONS

European Patent Office, European Search Report dated Dec. 10, 2018 in Application No. 18187992.5.

*Primary Examiner* — Nicholas J Lane

(74) *Attorney, Agent, or Firm* — Snell & Wilmer, L.L.P.

(57) ABSTRACT

A torque tube for a brake assembly, the torque tube includes a first tube segment, a second tube segment coupled to the first tube segment at a concatenation location, and a foot portion extending radially from the concatenation location, wherein said torque tube undergoes a change of thickness resulting in said first tube segment having a first thickness different than a second thickness of said second tube segment.

19 Claims, 4 Drawing Sheets

(56) References Cited

U.S. PATENT DOCUMENTS

| | | |
|---|---|---|
| 6,752,248 B2 | 6/2004 | Berwanger |
| 7,363,945 B2 | 4/2008 | Saha et al. |
| 8,950,557 B2 | 2/2015 | Houser |
| 2005/0194220 A1* | 9/2005 | Edmisten ................ F16D 55/36 188/71.5 |
| 2010/0140027 A1* | 6/2010 | Baden .................... F16D 55/36 188/71.5 |
| 2012/0325594 A1* | 12/2012 | Rook ...................... F16D 55/36 188/71.5 |
| 2018/0128331 A1* | 5/2018 | Stevenson .............. F16D 55/40 |

* cited by examiner

DIFFERENTIAL TORQUE PLATE BARREL THICKNESS

FIELD

The present disclosure relates to brake systems, and more specifically, to torque tubes of aircraft brake systems.

BACKGROUND

Airplanes and other types of aircrafts typically utilize brakes on the wheels to slow the aircraft during landings, takeoffs, and taxiing. The brake systems utilized by aircrafts generally employ a brake stack comprised of a series of friction disks, which may be forced into contact with one another to stop the aircraft. Under various conditions, brake actuation may yield friction-induced vibration at wear surfaces of the friction disks, which can cause out-of-plane motion (also known as "whirl"). Such friction-induced vibration is capable of damaging hardware on the aircraft.

SUMMARY

In various embodiments, a torque tube for a brake assembly includes a first tube segment, and a second tube segment coupled to the first tube segment at a concatenation location, wherein said torque tube undergoes a change of thickness resulting in said first tube segment having a first thickness different than a second thickness of said second tube segment In various embodiments, the torque tube includes a foot extending radially from the concatenation location.

In various embodiments of the torque tube, the second thickness is sized to be 50% to 75% greater than the first thickness, with a tolerance of 10%.

In various embodiments of the torque tube, the second thickness is at a thickness greater than the first thickness.

In various embodiments of the torque tube, a change of thickness occurs at the concatenation location wherein the change of thickness is an abrupt change of thickness.

In various embodiments of the torque tube, a change of thickness is a gradual change of thickness.

In various embodiments of the torque tube, the first thickness has a thickness of 0.174 inches and the second thickness has a thickness of 0.254 inches, with a tolerance of plus or minus 10%.

In various embodiments of the torque tube, the change of thickness occurs starting at a first transition location and ends at a second transition location.

In various embodiments of the torque tube, the first tube segment is an inboard barrel and the second tube segment is an outboard barrel.

In various embodiments of the torque tube, the first tube segment and second tube segment combine to form a barrel.

In various embodiments, a method of mitigating damage in a brake assembly includes thickening a first tube segment to a first thickness, thickening a second tube segment to a second thickness, and combining the first tube segment and the second tube segment at a concatenation location to form a torque tube.

In various embodiments, the method further includes extending a foot radially from the concatenation location.

In various embodiments of the method, a change of thickness occurs at the concatenation location.

In various embodiments of the method, the first thickness of the first tube segment is different than the second thickness of the second tube segment.

In various embodiments of the method, the first thickness is sized to be 50% to 75% greater than the second thickness, with a tolerance of plus or minus 10%.

In various embodiments of the method, the second thickness is at a thickness greater than the first thickness.

In various embodiments of the method, the change of thickness is an abrupt change of thickness.

In various embodiments of the method, the change of thickness is a gradual change of thickness.

In various embodiments of the method, the change of thickness occurs at a specific point.

In various embodiments of the method, the change of thickness occurs within a range starting at a first transition location and a second transition location.

In various embodiments, a torque tube for a brake assembly includes a first tube segment, a second tube segment coupled to the first tube segment, and a foot extending radially from a concatenation location, wherein a change of thickness occurs at a first transition location to a second transition location, wherein the first tube segment is at a first thickness different from a second thickness of the second tube segment.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
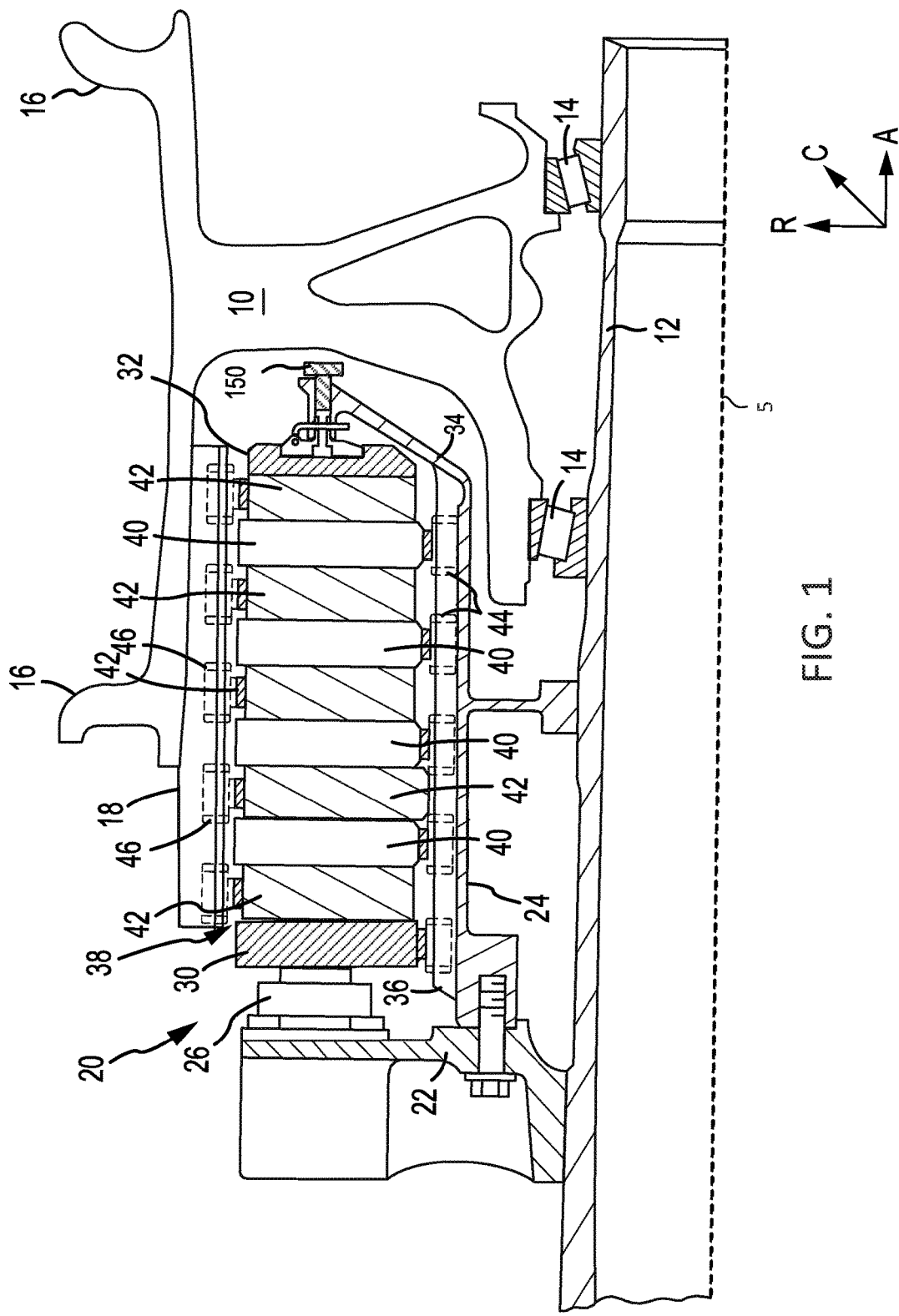
FIG. 1 illustrates a cross-sectional view of a brake assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

With reference to FIG. 1, a brake assembly 20 is illustrated, in accordance with various embodiments. An A-R-C axis has been included in the drawings to illustrate the axial (A), radial (R) and circumferential (C) directions. Brake assembly 20 may include a wheel 10 supported for rotation around axle 12 by bearings 14. Wheel 10 includes rims 16 for supporting a tire, and a series of axially extending rotor splines 18 (one shown). Rotation of wheel 10 is modulated by brake assembly 20. Brake assembly 20 includes piston housing 22, torque tube 24 (torque plate barrel 24), a plurality of pistons 26 (one shown), pressure plate 30, and end plate 32.

Brake assembly 20 also includes a plurality of friction disks 38. The plurality of friction disks 38 includes at least one non-rotatable friction disk 40, also known as a stator, and at least one rotatable friction disk 42, also known as a rotor. Each of the friction disks 38 includes an attachment structure. In various embodiments, and with reference to FIG. 1, each of the four non-rotatable friction disks 40 includes a plurality of stator lugs 44 at circumferentially spaced positions around non-rotatable friction disk 40 as an attachment structure. Similarly, each of the five rotatable friction disks 42 includes a plurality of rotor lugs 46 at circumferentially spaced positions around rotatable friction disk 42 as an attachment structure. In the embodiment of FIG. 1, pressure plate 30, end plate 32, and friction disks 38 are all annular structures made at least partially from a carbon composite material.

Piston housing 22 is mounted to axle 12. Torque tube 24 is bolted or otherwise coupled to piston housing 22 with conical back-leg portion 34 of torque tube 24 proximate an axial center of wheel 10. End plate 32 is connected or mounted to torque tube 24. End plate 32 is non-rotatable by virtue of its connection or frictional engagement to torque tube 24. Stator splines 36 may support pressure plate 30 such that pressure plate 30 is also non-rotatable. Stator splines 36 may also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Rotatable friction disks 42 are rotatable by virtue of their engagement with rotor splines 18 of wheel 10.

As shown in FIG. 1, rotatable friction disks 42 are arranged with end plate 32 on an end proximate wheel 10, pressure plate 30 on an end distal wheel 10 and proximate pistons 26, and non-rotatable friction disks 40 interleaved so that rotatable friction disks 42 are adjacent to non-rotatable friction components (e.g., interleaved rotors and stators). Pistons 26 are connected to piston housing 22 at circumferentially spaced positions around piston housing 22. Pistons 26 face axially toward wheel 10 and contact a side of pressure plate 30 opposite rotatable friction disks 42. Pistons 26 may be powered electrically, hydraulically, or pneumatically.

In various embodiments, in response to actuation of pistons 26, a force is exerted on the rotatable friction disks 42 and the non-rotatable friction disks 40 towards conical back-leg portion 34. The rotatable friction disks 42 and the non-rotatable friction disks 40 may thus be pressed together between pressure plate 30 and end plate 32.

Under various conditions, brake actuation may yield friction-induced vibration at wear surfaces of the friction disks. Without sufficient structural support at torque tube 24, conventional brake assemblies may experience out-of-plane motion (also known as "whirl"), which may lead to, for example, brake assembly 20 being damaged. The present disclosure, according to various embodiments and with reference to FIG. 2, provides a torque tube with varying thickness to provide increased structural support for brake assembly 20.

Figure 2:
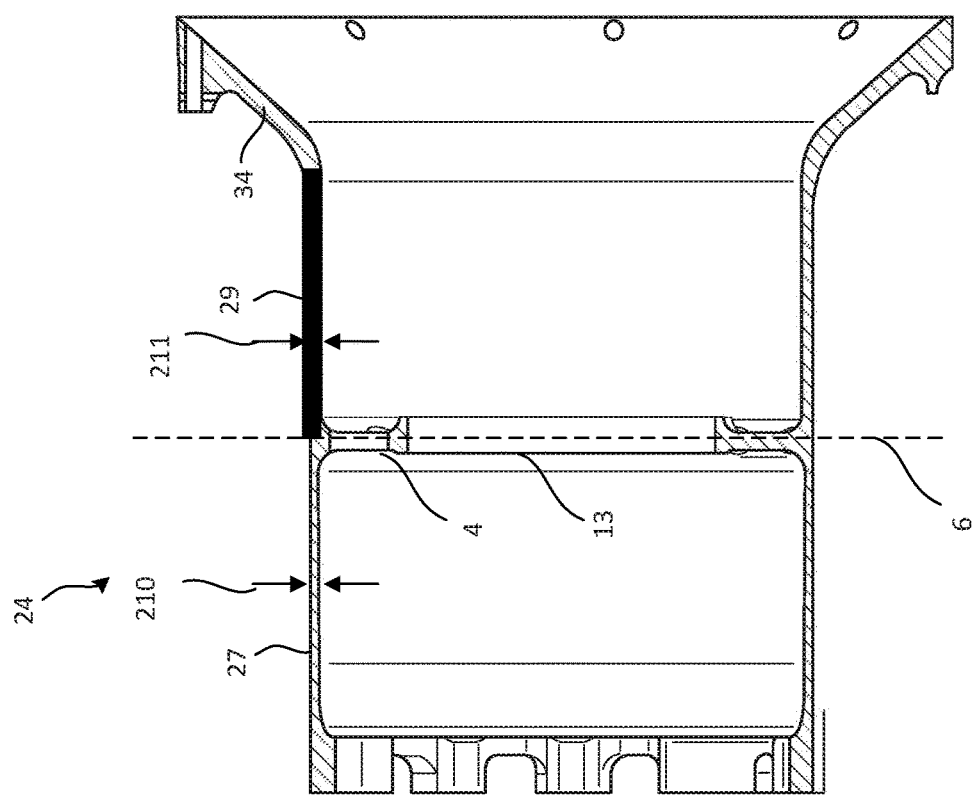
FIG. 2 illustrates a cross-sectional view of a torque tube, in accordance with various embodiments.

With reference to FIG. 2, torque tube 24 for brake assembly 20 is shown according to various embodiments. In various embodiments, torque tube 24 may include an inboard barrel 27 (first tube segment 27), an outboard barrel 29 (second tube segment 29), and a conical back-leg portion 34. In various embodiments, torque tube 24 may be an elongated annular structure that also includes a series of axially extending stator splines 36 (shown in FIG. 1). Conical back-leg portion 34 and stator splines 36 may be integral with torque tube 24, as shown in FIG. 1, or they may each be attached to torque tube 24 as separate components. In various embodiments, inboard barrel 27 may be coupled to outboard barrel 29 at a concatenation location 6. In various embodiments, foot 4 extends radially inward from concatenation location 6. In various embodiments, foot 4 extends radially inward towards axle 13.

In various embodiments, a change of thickness from the inboard barrel 27 to the outboard barrel 29 occurs at concatenation location 6. Increasing the thickness of torque tube 24 increases the strength of torque tube 24 and brake assembly 20 because a thicker material can withstand more stress and strain caused during normal operations of brake assembly 20. A change or increase in thickness from, for example, the inboard barrel 27 to the outboard barrel 29, can improve the strength of torque tube 24 without adding the additional weight of increasing the width of the entire torque tube 24 and can prevent and/or mitigate friction-induced vibrations (e.g., out-of-plane vibrational movement or "whirl").

In various embodiments, inboard barrel 27 may have a first thickness 210 that is different from a second thickness 211 of outboard barrel 29. The second thickness 211 of outboard barrel 29 may be greater than the first thickness 210 of inboard barrel 27 to allow for an increase in strength from inboard barrel 27 of torque tube 24 to outboard barrel 29 of torque tube 24. For example, second thickness 211 may be sized to be 50% to 75% greater than first thickness 210, between 55% to 70% greater than first thickness 210, and/or between 60% to 68% greater than first thickness 210. In various embodiments, the percentages may have a tolerance of plus or minus 10%.

In various embodiments, torque tube 24 undergoes a change of thickness resulting in the first tube segment having a first thickness 210 different than a second thickness 211 of the second tube segment. In various embodiments, the change of thickness from first thickness 210 at inboard barrel 27 to second thickness 211 of outboard barrel 29 occurs abruptly at concatenation location 6. The change of thickness may be, for example, an abrupt change of thickness. An abrupt change in thickness may be, for example, a change of thickness where immediately before concatenation location 6, first thickness 210 has a thickness different than the thickness immediately following concatenation location 6. For example, first thickness 210 of inboard barrel 27 may have a thickness of 0.174 inches (0.00441 m) and the second thickness 211 of outboard barrel 29 was 0.254 inches (0.00645 m). In various embodiments, first thickness 210 is sized to be between 0.118 inches (0.003 m) to 0.236 inches (0.006 m), between 0.157 inches (0.004 m) to 0.276 inches (0.007 m), and/or between 0.079 inches (0.002 m) to 0.197 inches (0.005 m). In various embodiments, second thickness 210 is sized to be between 0.157 inches (0.004 m) to 0.276 inches (0.007 m), 0.197 inches (0.005 m) to 0.032 inches (0.008 m), and/or between 0.236 inches (0.006 m) to 0.032 inches (0.008 m). In various embodiments, the thicknesses may have a tolerance of plus or minus 10%.

In various embodiments, the role of foot 4 as it relates to whirl mitigation is to provide support to torque tube 24 at the line of demarcation, i.e., concatenation location 6. Foot 4 may serve as a line of demarcation in the sense that a thickness in the region to the left of foot 4 (inboard barrel 27) may be thinner than the thickness on the right of foot 4 (outboard barrel 29). That is, the portion of torque tube 24 on the left of foot 4 blends to a thinner barrel (inboard barrel 27) and the portion of torque tube 24 on the right of foot 4 blends to a thicker barrel (outboard barrel 29).

Figure 3:
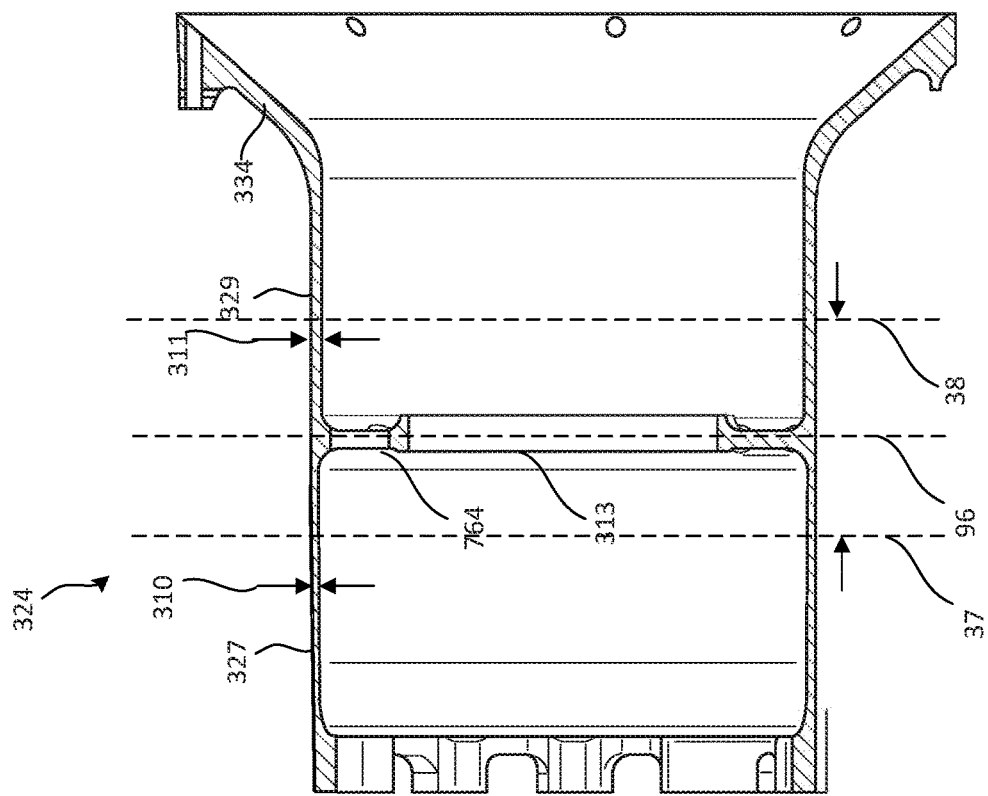
FIG. 3 illustrates a cross-sectional view of a torque tube, in accordance with various embodiments.

With reference to FIG. 3, a torque tube 324 for brake assembly 20 is shown according to various embodiments. FIG. 3 depicts various embodiments in which a gradual change of thickness occurs in the torque tube 324. Torque tube 324 may also include an inboard barrel 327 (first tube segment 327), an outboard barrel 329 (second tube segment 329), and a conical back-leg portion 334. Similar to various embodiments shown in FIG. 2, torque tube 324 may be an elongated annular structure that includes inboard barrel 327, outboard barrel 329, a conical back-leg portion 334, and a series of axially extending stator splines 36 (shown in FIG. 1).

In various embodiments, inboard barrel 329 may be coupled to outboard barrel 329 at a concatenation location 96. In various embodiments, foot 764 extends radially inward from concatenation location 96. In various embodiments, foot 764 extends radially inward towards axle 313.

In various embodiments, a change of thickness commences at transition location 37 and extends axially to transition location 38. In various embodiments, the change from first thickness 310 to second thickness 311 may be a gradual change in thickness. For example, the thickness of first thickness 310 may change at a rate of 1% for the duration of the period between transition location 37 and transition location 38. For example, when traveling axially from transition location 37 to transition location 38, the thickness of torque tube 324 may change at a nested percentage rate of 1% to 8%. In various embodiments, the percentage rate may have a tolerance of plus or minus 4%.

Figure 4:
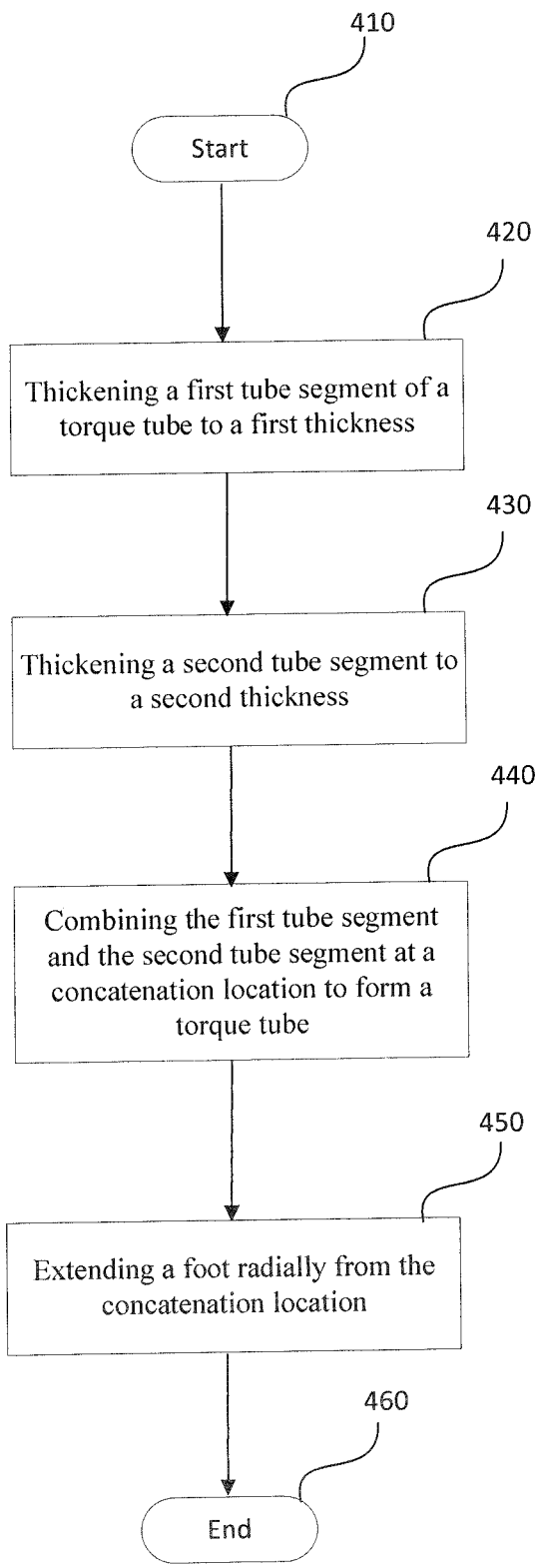
FIG. 4 illustrates a method of mitigating damage in a brake assembly, in accordance with various embodiments.

With reference to FIG. 4, a method of mitigating damage in a brake assembly 20 is illustrated according to various embodiments. In various embodiments, the method commences with start step 410. Thickening a first tube segment 27 to a first thickness occurs in step 420. In step 430, the step includes thickening a second tube segment 29 to a second thickness. In step 440, the step includes combining the first tube segment 27 and the second tube segment 29 at a concatenation location to form torque tube 24 or torque tube 324. In various embodiments, extending a foot radially from the concatenation location occurs in step 450. In various embodiments, first tube segment 27, second tube segment 29, torque tube 24, torque tube 324, and foot 4 may be subtractively manufactured, such as, for example, on a lathe. The method ends at end step 460. In various embodiments, the thickening and/or varying of the thickness of first tube segment 27 and/or second tube segment 29 may occur during the manufacturing of torque tube 24 and/or torque tube 324. The method steps above likewise apply similarly to torque tube 324 and respective features.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque tube for a brake assembly, the torque tube comprising:
    a first tube segment having a first end, the first tube segment including a first outer diameter extending from the first end to a concatenation location;
    a second tube segment coupled to said first tube segment at the concatenation location, the second tube segment having a conical back leg portion, the second tube segment including a second outer diameter extending from the concatenation location to the conical back leg portion; and
    a foot extending radially from said concatenation location,
    wherein said torque tube undergoes a change of thickness resulting in said first tube segment having a first thickness different than a second thickness of said second tube segment,
    wherein said second thickness is greater than said first thickness,
    wherein the first outer diameter and the second outer diameter are equal, and
    wherein said second thickness extends from the concatenation location to the conical back leg portion.

2. The torque tube of claim 1, wherein said change of thickness is an abrupt change of thickness.

3. The torque tube of claim 1, wherein said first thickness is 0.174 inches and said second thickness is 0.254 inches.

4. The torque tube of claim 1, wherein said change of thickness occurs starting at a first transition location and ends at a second transition location.

5. The torque tube of claim 1, wherein said first tube segment is an inboard barrel and said second tube segment is an outboard barrel.

6. The torque tube of claim 1, wherein said first tube segment and said second tube segment combine to form a barrel.

7. The torque tube of claim 1, wherein the first thickness and the second thickness are along a single plane taken from a longitudinal cross-section from the torque tube.

8. A method of mitigating damage in a brake assembly, comprising:
    thickening a first tube segment to a first thickness, the first tube segment having a first end and a first outer diameter;
    thickening a second tube segment to a second thickness, the second tube segment having a second outer diameter;
    coupling a back conical portion to the second tube segment;
    combining said first tube segment and said second tube segment at a concatenation location to form a torque tube and
    extending a foot radially from said concatenation location,
    wherein the first outer diameter extends from the first end of the first tube segment to the concatenation location,
    wherein the second outer diameter extends from the concatenation location to the back conical portion,
    wherein the first outer diameter and the second outer diameter are equal, and
    wherein the second thickness is greater than the first thickness.

9. The method of claim 8, wherein a change of thickness occurs at said concatenation location.

10. The method of claim 9, wherein said change of thickness is an abrupt change of thickness.

11. The method of claim 9, wherein said change of thickness is a gradual change of thickness.

12. The method of claim 9, wherein said change of thickness occurs at a specific point.

13. The method of claim 9, wherein said change of thickness occurs within a range starting at a first transition location and a second transition location.

14. The method of claim 8, wherein the first thickness and the second thickness are along a single plane taken from a longitudinal cross-section from the torque tube.

15. A torque tube for a brake assembly, the torque tube comprising:
    a first tube segment having a first transition location;
    a second tube segment coupled to said first tube segment, the second tube segment having a second transition location;
    a concatenation location disposed between the first tube segment and the second tube segment;
    a conical back leg portion coupled to the second tube segment; and
    a foot extending radially from the concatenation location,
    wherein a change of thickness occurs at the first transition location and increases gradually to the second transition location, wherein said first tube segment is at a first thickness forward of the first transition location different from a second thickness aft of the second transition location of said second tube segment, wherein the first transition location is forward of the concatenation location, and wherein the second transition location is aft of the concatenation location.

16. The torque tube of claim 15, wherein a thickness rate of change between the first transition location and the second transition location is between 1% and 8%.

17. The torque tube of claim 15, wherein the first thickness and the second thickness are along a single plane taken from a longitudinal cross-section from the torque tube.

18. A torque tube for a brake assembly, the torque tube comprising:
    a first tube segment having a first end, the first tube segment including a first outer diameter extending from the first end to a concatenation location; and
    a second tube segment coupled to said first tube segment at the concatenation location, the second tube segment having a conical back leg portion, the second tube segment including a second outer diameter extending from the concatenation location to the conical back leg portion, wherein said torque tube undergoes a change of thickness resulting in said first tube segment having a first thickness different than a second thickness of said second tube segment, wherein said second thickness is greater than said first thickness, wherein the first outer diameter and the second outer diameter are equal, wherein said second thickness extends from the concatenation location to the conical back leg portion, and wherein said change of thickness is an abrupt change of thickness.

19. A method of mitigating damage in a brake assembly, comprising:

thickening a first tube segment to a first thickness, the first tube segment having a first end and a first outer diameter;

thickening a second tube segment to a second thickness, the second tube segment having a second outer diameter;

coupling a back conical portion to the second tube segment; and combining said first tube segment and said second tube segment at a concatenation location to form a torque tube, wherein the first outer diameter extends from the first end of the first tube segment to the concatenation location, wherein the second outer diameter extends from the concatenation location to the back conical portion, wherein the first outer diameter and the second outer diameter are equal, wherein the second thickness is greater than the first thickness, wherein a change of thickness occurs at said concatenation location, and wherein said change of thickness is an abrupt change of thickness.

* * * * *